L. C. IVES.
Grain-Register.
No. 211,740. Patented Jan. 28, 1879.
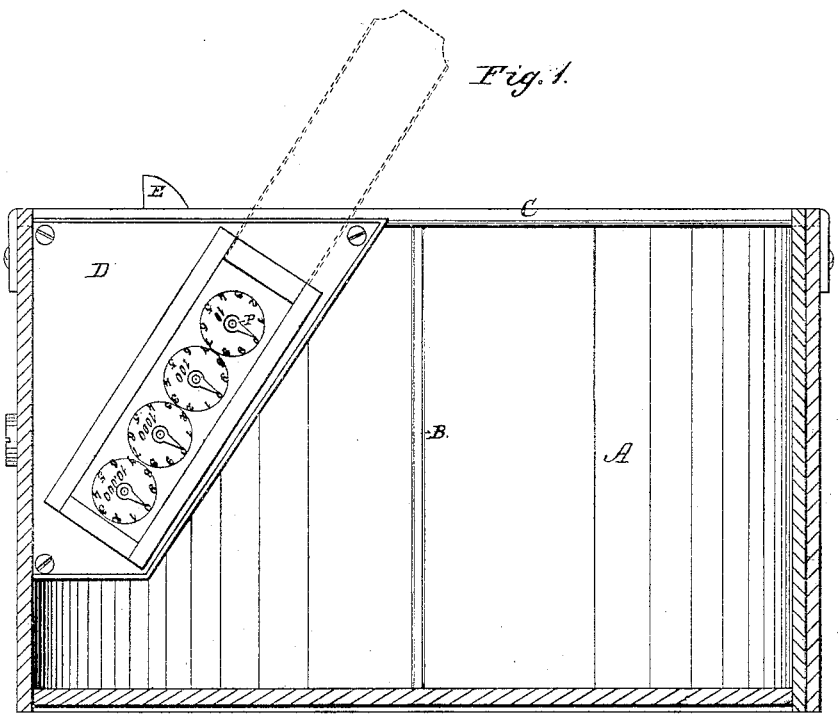
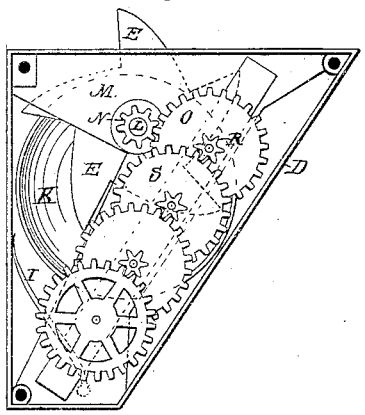
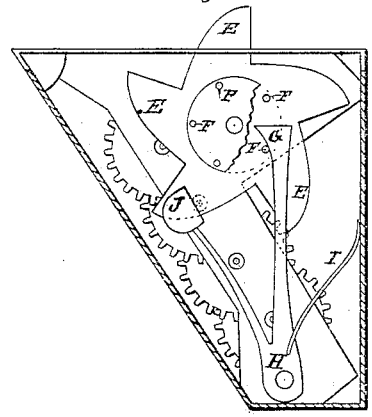
WITNESSES:
W. W. Hollingsworth
John C. Kennon
INVENTOR:
Luther C. Ives
BY
ATTORNEYS.

UNITED STATES PATENT OFFICE.

LUTHER C. IVES, OF INDIAN CREEK, VIRGINIA.

IMPROVEMENT IN GRAIN-REGISTERS.

Specification forming part of Letters Patent No. 211,740, dated January 28, 1879; application filed September 17, 1878.

*To all whom it may concern:*

Be it known that I, LUTHER C. IVES, of Indian Creek, in the county of Norfolk and State of Virginia, have invented a new and Improved Grain-Measure Register; and I do hereby declare that the following is a full, clear, and exact description of the same.

My invention relates to a measure provided with a registering device; and it consists, first, in combining with the ordinary grain-measure a device that, by the act of "striking off" the surplus grain, will ring a bell and operate the register; and, secondly, in certain combinations of instrumentalities whereby the first feature of my invention is carried out.

In the accompanying drawings, Figure 1 shows a vertical section of a measure provided with my registering device; Fig. 2, a detail view of the gearing, and Fig. 3 a detail of the bell-striking device.

A represents the measure, which in this case may be a half-bushel, having in its center an upright, B, forming an additional support for the cross-piece C. To the side of the measure is attached a casing, D, containing the registering apparatus, the top of which is on a level with the cross-piece C, and has an aperture, through which works the teeth of a tappet-wheel, E, provided with a series of pins, F, which operate on the nose G of the hammer-lever H, pushing it back against the power of the spring I, which, by its rebound, causes the hammer J to strike the bell K. The tappet-wheel runs on a shaft, L, having on the opposite side of the plate M, in which it has its bearing, a pinion, N, which meshes with the spur-wheel O, on the shaft of which is the pointer P and a pinion, R, gearing with the next wheel, S, in the train, which also has a pointer and pinion, the latter giving motion to a third wheel, whose pinion, in its turn, operates a fourth wheel, carrying another pointer, the whole train of wheels and pinions being substantially the same and operating in the same way as those usually employed in registers for gas-meters, &c.

The pointers and dials are covered, when the measure is in use, by a slide. (Shown open in dotted lines in Fig. 1.)

When in operation, the measure is filled with the grain, and the "striker" is drawn across the top to level off the grain, in the usual manner; but as it passes over the case it strikes the projecting tooth of the tappet-wheel E, giving the latter one-fifth of a revolution, which, through the medium of the pinion N and spur-wheel O, moves the pointer P a space equal to half the distance between two figures on the unit-dial. Each subsequent strike moves the index a corresponding distance, so that each figure on the unit-dial indicates the filling of the measure twice, and as the measure used is a half-bushel, the figures will therefore register bushels.

From the description above given it is evident that, in addition to the operation of the register, each movement of the tappet-wheel will cause one of the pins F to push back the nose of the hammer-lever until it scrapes off said pin, when the spring I will cause the hammer J to rebound and ring the bell.

The gearing is proportioned to be used with a half-bushel measure, and yet register bushels; but, of course, the pinion N and spur-wheel O may be so proportioned to each other as to indicate a bushel for the movement of one tooth of the tappet-wheel.

By this arrangement an accurate registration of the number of times the measure has been filled can be readily obtained, and both buyer and seller are informed by the sound of the bell every time a measure is "struck."

It is obvious that in lieu of the tappet-wheel a reciprocating or vibratory device, so arranged as to be operated by the striker, may be used to operate the bell and register.

What I claim as new is—

1. The combination, with the portable or hand grain-measure A, of the registering device, which is attached thereto, and a tappet, which is operatively connected with said registering device, and arranged substantially as shown and described, so that in passing over the measure the striker will operate said device by contact with the tappet, as specified.

2. The combination, with the portable or hand grain-measure A, of the alarm mechanism, which is attached thereto, and a tappet, which is operatively connected with said mechanism, and arranged substantially as shown and described, so that in passing over the measure the striker will operate said mechanism by contact with the tappet, as specified.

3. The combination, with the tappet-wheel E, of the pins F, lever H, spring I, hammer J, and bell K, substantially as described.

The above specification of my invention signed by me this 12th day of September, 1878.

LUTHER C. IVES.

Witnesses:
SOLON C. KEMON,
CHAS. A. PETTIT.